United States Patent

Liberman

[15] 3,653,817

[45] Apr. 4, 1972

[54] METHOD FOR PREPARING A RARE EARTH PHOSPHOR

[72] Inventor: Israel A. Liberman, Chicago, Ill.

[73] Assignee: Zenith Radio Corporation, Chicago, Ill.

[22] Filed: June 30, 1969

[21] Appl. No.: 837,867

[52] U.S. Cl. ..............................................23/21, 23/110 R
[51] Int. Cl. .......................................................C22b 59/00
[58] Field of Search ........................................23/21, 51, 110

[56] References Cited

UNITED STATES PATENTS 3,370,916  2/1968  Shafer..........................................23/21
3,399,957  9/1968  Shafer.......................................23/21 X

*Primary Examiner*—Herbert T. Carter
*Attorney*—John J. Pederson

[57] ABSTRACT

A phosphor is prepared by conversion of a rare earth oxide, the rare earth element appearing in its normal trivalent state in the oxide but in its bivalent state in the phosphor. The conversion is achieved by initially mixing, in their dry solid states, the oxide with a reducing agent and then heating the mixture in a vacuum. The composition of the agent is such that it is oxidized and forms part of the phosphor. An appropriate reducing agent, by way of example, is silicon monoxide, in which case the resulting phosphor constitutes a rare earth silicate.

3 Claims, No Drawings

METHOD FOR PREPARING A RARE EARTH PHOSPHOR

BACKGROUND OF THE INVENTION

This invention relates to a new and improved method for preparing various phosphors containing any one of the rare earth elements or lanthanides. Although the invention is applicable to any of the rare earths, for illustrative purposes it will be described in connection with the rare earth element europium.

Rare earth phosphors, of various compositions and made by a variety of processes, are used in color television picture tubes for emitting light of different colors. There are some phosphors, containing inter alia oxygen plus a rare earth element in its bivalent state (such as the europous silicates), while having limited light emitting properties by themselves do provide excellent intermediate compounds from which rare earth phosphors suitable for commercial color picture tubes may be produced. In the past, however, substantial difficulty was always encountered in the preparation of those intermediate compounds. Extremely high working temperatures were required, gases were given off by the reactants, and risks of explosions were present. By the use of applicant's invention, in sharp contrast, those intermediate compounds may now be prepared without experiencing any of the above disadvantages. Only relatively low working temperatures are needed, no gases are evolved and there are no explosion risks.

An object of the invention, therefore, is to provide a novel, relatively simple and inexpensive method for preparing a rare earth phosphor.

In accordance with a feature of the invention, a rare earth phosphor is produced by conversion of the oxide of a rare earth element which appears in its usual trivalent state in its oxide but in its bivalent state in the phosphor. It is thus another object to provide a new and improved method for converting a rare earth oxide to a rare earth phosphor, in which phosphor the rare earth element appears in its lower valency state.

SUMMARY OF THE INVENTION

In accordance with one aspect of the invention, a method is disclosed for converting the oxide of a rare earth element, appearing in its trivalent state, to a rare earth phosphor in which the rare earth element appears in its bivalent state. The method comprises mixing the oxide with a reducing agent and then heating the mixture in a vacuum, the composition of the reducing agent being such that it remains in and forms part of the phosphor.

DESCRIPTION OF VARIOUS EMBODIMENTS

The invention may be employed to produce several different phosphors each containing the rare earth europium. Common to all of them is the fact that each is developed by combining the oxide of europium, namely europic oxide, with a reducing agent of a type that remains in and becomes part of the phosphor. In other words, none of the elements of the agent will be given off in gaseous form. One excellent reducing agent, satisfying the necessary qualifications, is silicon monoxide. Various rare earth silicates, all of which are capable of emitting blue light to some extent, may be prepared from the materials europic oxide and silicon monoxide by themselves and in combination with other elements. For example, mixing only the compounds europic oxide and silicon monoxide, the rare earth phosphor europous orthosilicate may be produced in accordance with the method of the invention.

More specifically, europous orthosilicate $Eu_2SiO_4$ is made by initially mixing europic oxide $Eu_2O_3$ and silicon monoxide SiO in their dry solid states and in correct stoichiometric amounts (such as 1.76 grams of europic oxide and 0.22 gram of silicon monoxide) according to the equation:

$$Eu_2O_3 + SiO \rightarrow Eu_2SiO_4$$

The mixture is placed in a vessel or container which is then evacuated and sealed. It is then heated for approximately 3 hours at a temperature between 700° and 900° C. As a consequence of this heat treatment, the silicon monoxide SiO becomes gaseous and diffuses into the europic oxide $Eu_2O_3$ with which it reacts to form europous oxide EuO and silicon dioxide $SiO_2$ in close and intimate contact. Further heating, at a temperature in the range from 1,000° to 1,400° C., for several hours results in a solid state reaction to form the product europous orthosilicate $Eu_2SiO_4$. Because of the diffusion of the silicon monoxide into the europic oxide, which creates an intimate and reactive mixture, only a relatively short time and relatively low temperatures are required to complete the entire reaction.

By the above equation it is apparent that the europium, which appears in its normal trivalent state in its oxide, is in its bivalent state in the resulting europous orthosilicate $Eu_2SiO_4$. The equation also reflects the fact that the reducing agent silicon monoxide forms part of the silicate and nothing is removed from the system. This permits the mixture to be heated in a sealed evacuated container. Under such circumstances there is no possibility of explosion.

Another rare earth silicate that can be made in accordance with the invention, and in a similar manner as the previous example, is europous metasilicate $EuSiO_3$. To prepare it, europic oxide $Eu_2O_3$, silicon monoxide SiO and silicon dioxide $SiO_2$ are mixed in their dry solid states and in their correct stoichiometric amounts (such as 3.52 grams of europic oxide, 0.44 grams of silicon monoxide and 0.60 grams of silicon dioxide) according to the equation:

$$Eu_2O_3 + SiO + SiO_2 \rightarrow 2EuSiO_3$$

The mixture is heated in a vacuum at around 800° C. for 2 hours and then at 1,000° C. for an additional 4 hours.

As still another example, europous oxyorthosilicate $Eu_3SiO_5$ may be prepared by mixing europic oxide $Eu_2O_3$, silicon Si and silicon monoxide SiO in the correct stoichiometric amounts according to the equation:

$$3Eu_2O_3 + Si + SiO \rightarrow 2Eu_3SiO_5$$

This silicate is also made in the same general manner as the two previous examples. Initial heating of the mixture in a vacuum at a temperature between 700° and 900° C. causes the reaction to take place presumably in the following stages:

1. $Eu_2O_3 + SiO \rightarrow 2EuO + SiO_2$
2. $Si + SiO_2 \rightarrow 2SiO$
3. $2Eu_2O_3 + 2SiO \rightarrow 4EuO + 2SiO_2$
4. $\overline{3Eu_2O_3 + Si + SiO \rightarrow 6EuO + 2SiO_2}$ The silicon dioxide $SiO_2$ formed in reaction (1) by oxidation of the silicon monoxide SiO reacts in accordance with equation (2) with the element silicon Si present to produce additional silicon monoxide which, in equation (3), in turn reduces the remainder of the europic oxide $Eu_2O_3$ to form europous oxide EuO and silicon dioxide $SiO_2$. Subsequent heating of the products of reaction (4) at a higher temperature produces the europous oxyorthosilicate $Eu_3SiO_5$ by means of the solid state reaction:

5. $6EuO + 2SiO_2 \rightarrow 2Eu_3SiO_5$
   or $3EuO + SiO_2 \rightarrow Eu_3SiO_5$ None of the silicates, produced in the above three examples, by itself has adequate light emitting characteristics to qualify for incorporation in a commercial color picture tube. However, by the use of well known chemical processes each can easily be converted to a blue phosphor of the requisite quality.

As mentioned, while the invention has been described in conjunction with the rare earth europium, it may be employed for the preparation of phosphors containing any one of the 13 other rare earths. The method of the invention has general and wide application to a large number of rare earth phosphors compounds.

In each of the three specific examples only low temperatures were necessary to effect the desired reactions. In all applications of the invention, the temperatures need only be somewhere in the range from 700° to 1,400° C.

While particular embodiments of the invention have been described, it is obvious to those skilled in the art that changes and modifications may be made without departing from the invention in its broader aspects, and therefore, it is intended in the appended claims to cover all such modifications and changes as they fall within the true spirit and scope of the invention.

I claim:

1. A method of preparing the phosphor precursor europous orthosilicate comprising:
providing a mixture of europic oxide and silicon monoxide in their dry solid states and in substantially stoichiometric proportions according to the equation:

$$Eu_2O_3 + SiO \rightarrow Eu_2SiO_4;$$

heating said mixture in a vacuum at a temperature between 700° and 900° C. to cause said silicon monoxide to become gaseous and to diffuse into said europic oxide to form europous oxide and silicon dioxide in close intimate contact;
and thereupon increasing said temperature to an elevated temperature in the range of 1,000° to 1,400° C. and maintaining said europous oxide and said silicon dioxide at said elevated temperature to effect a solid state reaction to form europous orthosilicate.

2. A method of preparing the phosphor precursor europous metasilicate comprising:
providing a mixture of europic oxide, silicon dioxide and silicon monoxide in their dry solid states and in substantially stoichiometric amounts according to the equation:

$$Eu_2O_3 + SiO + SiO_2 \rightarrow 2EuSiO_3;$$

heating said mixture in a vacuum at a temperature of approximately 800° C. to cause said silicon monoxide to become gaseous and to diffuse into said europic oxide to form europous oxide and silicon dioxide in close intimate contact;
and thereupon increasing said temperature to an elevated temperature of approximately 1,000° C. and maintaining said europous oxide and said silicon dioxide at said elevated temperature to effect a solid state reaction to form europous metasilicate.

3. A method of preparing the phosphor precursor europous oxyorthosilicate comprising:
providing a mixture of europic oxide, silicon, and silicon monoxide in their dry solid states and in substantially stoichiometric amounts according to the equation:

$$3Eu_2O_3 + Si + SiO \rightarrow 2Eu_3SiO_5;$$

heating said mixture in a vacuum at a temperature between 700° and 900° C. to form europous oxide and silicon dioxide in close intimate contact;
and thereupon increasing said temperature to an elevated temperature in the range of 1,000° and 1,400° C. and maintaining said europous oxide and said silicon dioxide at said elevated temperature to effect a solid state reaction to form europous oxyorthosilicate.

* * * * *